United States Patent
Wik

(10) Patent No.: US 7,603,509 B1
(45) Date of Patent: Oct. 13, 2009

(54) CROSSBAR SWITCH WITH GROUPED INPUTS AND OUTPUTS

(75) Inventor: Thomas Robert Wik, Livermore, CA (US)

(73) Assignee: Adaptive Design Solutions, Inc., Milpitas, CA (US)

( * ) Notice: Subject to any disclaimer, the term of this patent is extended or adjusted under 35 U.S.C. 154(b) by 93 days.

(21) Appl. No.: 12/069,037

(22) Filed: Feb. 6, 2008

(51) Int. Cl.
*G06F 13/42* (2006.01)

(52) U.S. Cl. ........................ 710/317; 710/316

(58) Field of Classification Search ......... 710/306–309, 710/315–317
See application file for complete search history.

(56) References Cited

U.S. PATENT DOCUMENTS

| | | | |
|---|---|---|---|
| 5,179,552 A * | 1/1993 | Chao | 370/427 |
| 6,034,956 A * | 3/2000 | Olnowich et al. | 370/388 |
| 6,182,185 B1 * | 1/2001 | Stokes | 710/317 |
| 6,256,700 B1 * | 7/2001 | Sauber | 710/316 |
| 6,687,781 B2 * | 2/2004 | Wynne et al. | 710/317 |
| 6,999,466 B2 * | 2/2006 | Li | 370/434 |
| 7,185,174 B2 * | 2/2007 | Stewart et al. | 712/11 |

FOREIGN PATENT DOCUMENTS

WO    WO98/11757    *    3/1998

* cited by examiner

*Primary Examiner*—Raymond N Phan

(57) ABSTRACT

A crossbar switch is optimized for area, performance, and power by grouping the data lines that comprise the input ports and output ports of the switch into a plurality of separate cross-point blocks. Each cross-point block contains a complete set of input and output ports but the number of data lines comprising the input and output ports of each separate cross-point block is reduced to fraction of the number of data lines contained in each port of the crossbar switch. This fraction is equal to one divided by the number of separate cross-point blocks. Area, performance, and power of the crossbar switch are improved provided the area of the crossbar switch without grouping of data lines into separate cross-point blocks is determined by the pitch of the data lines rather than the area of the cross-point circuits. The number of blocks can be selected to optimize area, performance and power.

3 Claims, 4 Drawing Sheets

CROSSBAR SWITCH WITH GROUPED INPUTS AND OUTPUTS

CROSS-REFERENCE TO RELATED APPLICATIONS

This application claims the benefit of provisional patent application entitled Provisional Patent Application for a Crossbar Switch With Grouped Inputs and Outputs filed 2007 Feb. 7 by the present inventor.

FEDERALLY SPONSORED RESEARCH

Not Applicable

SEQUENCE LISTING OF PROGRAM

Not Applicable

BACKGROUND OF THE INVENTION

1. Field of Invention

This invention relates to the architecture of a crossbar switch which minimizes the area required for the cross-point array and as a result also maximizes the frequency of operation and minimizes the power dissipation.

2. Prior Art

Prior art for crossbar switches utilizes an architecture that co-locates all of the data lines that comprise an input port or an output port together so that all data lines comprising a given port are adjacent to one of the other data lines that comprise that same input or output port. In most semiconductor technologies including current process nodes with minimum features sizes of 45 nanometers or less, this results in sub-optimization of the area, performance and power. This results from the fact that the interconnect spacings for the data lines often require a larger area than the area required for the cross-point array that controls the switching of all data lines associated with an input port into a particular output port. This is not true for all crossbar switch configurations, but tends to be true for switches with wide data paths. The area required for routing of the data lines increases as the square of the number of data lines that comprise each port. The required number of cross points to control the connections between input and output ports increases linearly with the number of data lines that comprise each port. Thus for any crossbar switch there will always be a data-path width for which the area required for the routing of the data-path signals exceeds the area required for the transistors used to implement the cross-points. Furthermore if the length of the data-path signal lines can be reduced the transistors used for implementing the cross points can be made smaller, which further reduces the area required for the cross points.

OBJECTS AND ADVANTAGES

Crossbar switches are used commonly in networking and other applications. In many cases there is a need for a large number of input and output ports each comprised of a large number of input and output data lines operating at high frequencies on the order of a gigahertz or more. The number of ports can be greater than 20 and the number of data lines comprising each port can exceed 200. The function of the crossbar switch is to switch the group of data lines comprising one input port into the group of data lines comprising any output port. In a non-blocking switch there are no restrictions on which input ports can be switch to which output ports. This includes broadcast modes in which one input port is switched to many or all output ports.

Area, power dissipation, and frequency of operation are key metrics for all crossbar switches. Power dissipation can be very high because input and output data lines tend to be long for large switches, the frequency is high, and there can be a very large number of data lines. This means that $CV^2f$ active power dissipation is high, where C is the effective load capacitance of the data lines, V is the voltage swing on those lines and f is the frequency of operation. For large switches the power dissipation can be on the order of many Watts.

Prior art described in U.S. Pat. No. 6,426,656 uses limited voltage swings on data lines consisting of differential pairs to reduce the active power dissipation. This disclosure teaches how to configure the physical architecture of a crossbar switch in order to minimize the length of the data lines. This reduces the total area of the crossbar switch and the loading on the data lines, which in turn reduces the active power dissipation. Reduced data line lengths also enable higher frequencies of operation since the time constant of the data lines is reduced.

SUMMARY

Performance, power, area, and cost of crossbar switches are strongly dependent on the length of the data lines that comprise each of the input and output ports. The length of the data lines is dependent on the number of data lines in the orthogonal direction times the pitch of the signal lines including any overhead for shield lines required for one signal line. In addition there is some overhead for address, control, and power lines.

Lengths of the data lines are minimized by breaking the total width of the data path comprising each input port and each output port into n groups. Thus, if there are m data paths in each input port and m data paths in each output port, the number of data lines would be m/n in each group. Each group of input ports and output ports each consisting of m/n data lines is arranged into a block with the inputs along one edge and outputs along an orthogonal edge. The complete crossbar switch is comprised of n such blocks. The dimensions of each block are approximately 1/n times the dimensions of the corresponding crossbar switch if it were implemented as a single block (n=1). This ratio changes slightly due to the overhead of address busses for switch control, clock lines for timing, and power connections. A total of n blocks are required to implement the crossbar switch since the data-path width of each block is reduced by 1/n. The area is reduced by approximately 1/n since $n*((k*m*p)/n)^2 = (k*m*p)^2/n$, where k is the number of input ports (equals the number of output ports), m is the total number of data lines comprising each port, p is the pitch of the data lines, and n is the number of blocks. The area of the crossbar switch with no division into groups (n=1) is approximately $(k*m*p)^2$.

DRAWINGS

Figures

DETAILED DESCRIPTION

Figure 2:
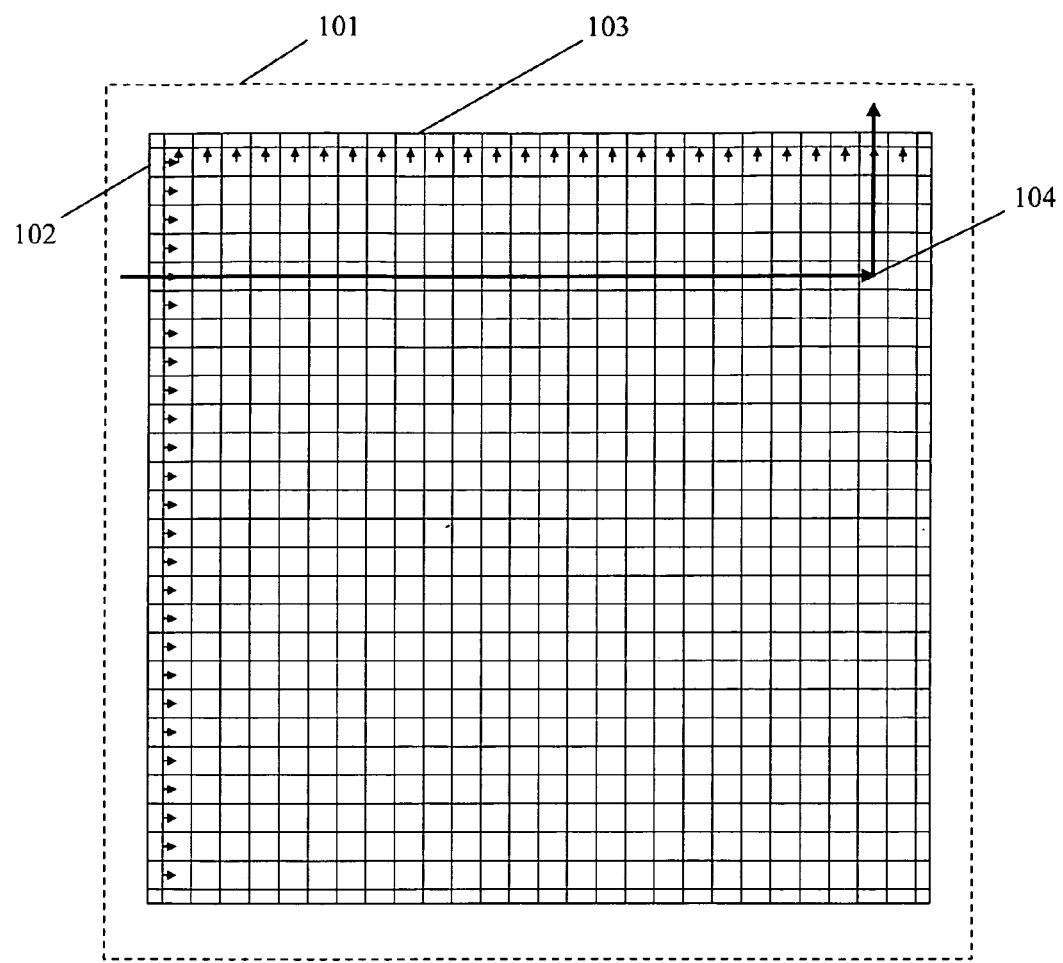
FIG. 2 shows a cross-point block which is one quadrant of the crossbar switch because it contains one-fourth of the data lines that comprise an input port or an output port.
Figure 3:
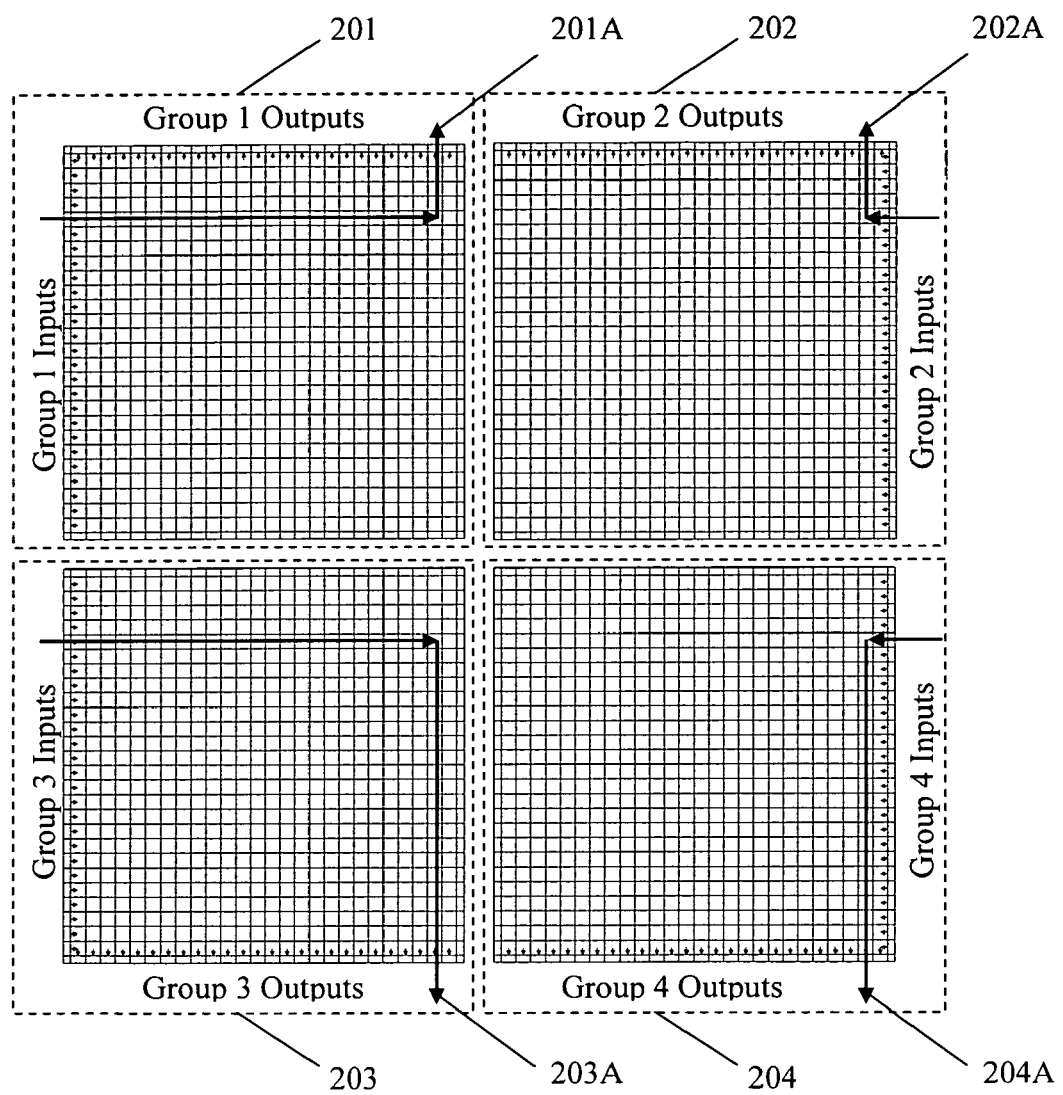
FIG. 3 shows four quadrants arranged together to form the complete crossbar switch.
Figure 4:
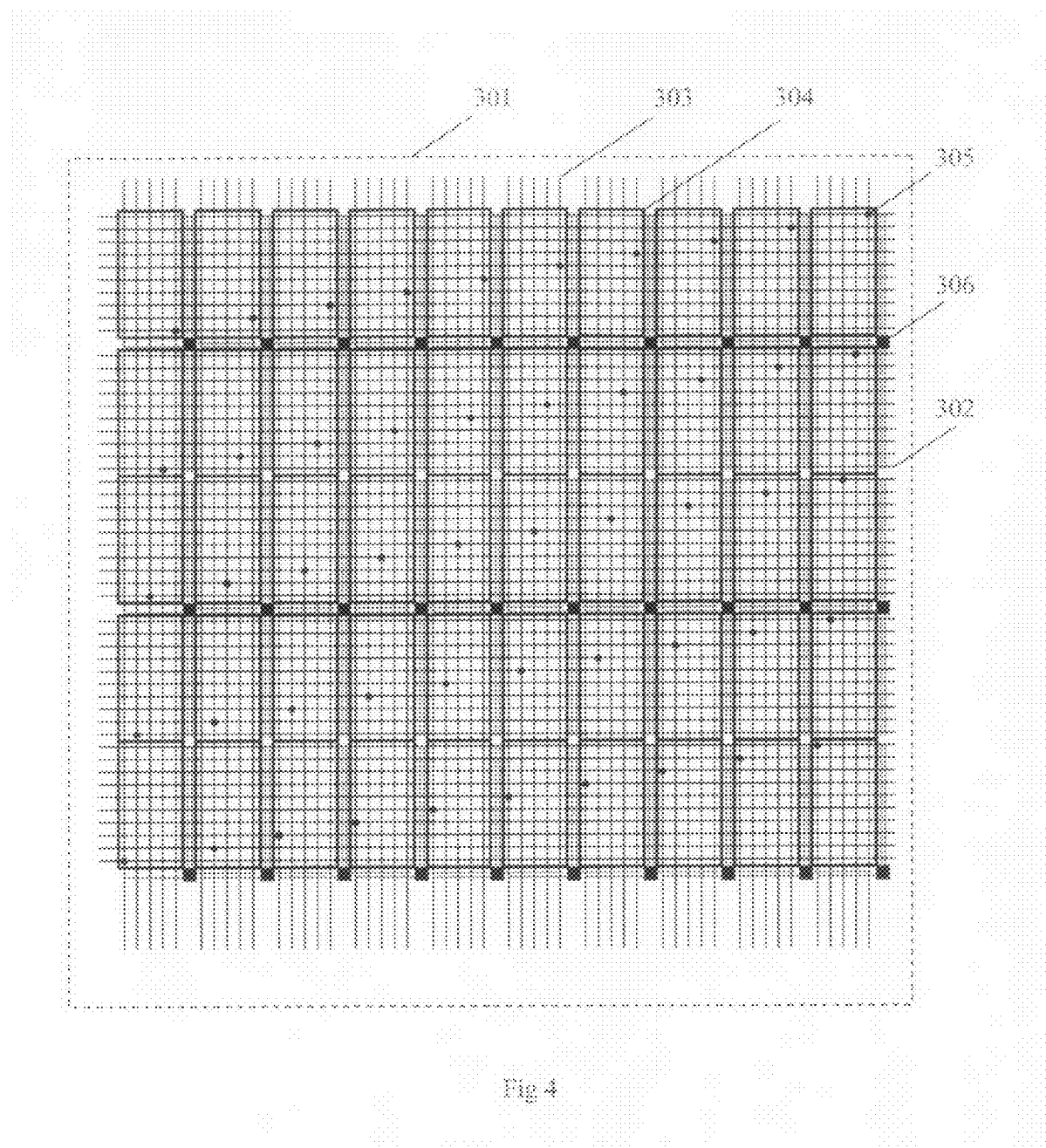
FIG. 4 shows the physical layout of a macro cell that contains all of the cross points for switching all of the data lines comprising one input port to all of the data lines comprising one output port for one of four groups of input and output ports.

Preferred Embodiment—FIGS. 2, 3, and 4

The fabric of the crossbar switch can be subdivided into any number of blocks. The optimum numbers of blocks depends on the area required for the cross points that conditionally switch data lines from one particular input port to data lines of one particular output port. If the optimum number of blocks is designated as n, then a convenient number for n is 4. This enables the individual blocks to represent quadrants that can be place together to form one compact switch fabric. This example will be used for further explanation of the preferred embodiment. In order to facilitate this detailed description a specific configuration will be assumed for the crossbar switch. The crossbar switch will be assumed to consist of 26 input ports and 26 output ports with 200 data lines per port.

FIG. 2 shows a cross-point block 101 which will be called a quadrant of the crossbar switch since there are four cross-point blocks for this example. A total of 26 input ports 102 are located along the left side of the quadrant and 26 output ports 103 are located along the top of the quadrant. A total of 26*26=676 macro cells 104 are defined by the intersections of each group of data lines comprising each input port with each group of data lines comprising each output port. Each input port has 50 buffers that drive 50 horizontal data lines across the full width of the quadrant. Each macro cell has 50 cross-point cells containing 50 cross point circuits. Each cross-point circuit consists of a sense amplifier that senses the data on the input data line (zero or one) and an associated output driver circuit that drives this data onto the output data line.

Output ports at the top of the quadrant contain a sense amplifier and an associated output driver circuit for each vertical data line. In this way the data state on the vertical data line can be sensed and driven to peripheral circuits outside the crossbar switch. The data buffers and drivers are strobed by clock signals which are not shown such that one data bit is transferred through the switch for each complete cycle of the clock. Also not shown are the address busses associated with each output port that activates one of the macro cells along the vertical length of each group of 50 output data paths comprising each output port. In this manner outputs received at each output port can be selected from any of the 26 input ports. The input port selected for each output port can be changed on any given clock cycle by changing the address impressed on the address bus for that output port. In this manner data from any of the 26 input ports can be switched to any of the 26 output ports.

FIG. 3 shows four quadrants arranged together to form the complete crossbar switch. Quadrant 201 is a duplication of the first quadrant of FIG. 2 with input ports along the left side and output ports along the top. Quadrant 202 contains a second group of 50 data lines for each of the 26 input and output ports. Input ports are located along the right side of this quadrant and output ports are located across the top. Quadrant 203 contains a third group of 50 data lines for each of the 26 input and output ports. Input ports are located long the left side of this quadrant and output ports are located across the bottom. Quadrant 204 contains a fourth group of 50 data lines for each of the 26 input and output ports. Input ports are located along the right side of this quadrant and output ports are located across the bottom.

FIG. 4 shows the physical layout of the macro cell 301. The macro cell contains 50 input lines that run horizontally 302 and 50 output lines that run vertically 303. The macro cell contains 50 cross-point cells 304. Cross-point cells are rectangular in shape with 10 data-line pitches in the vertical direction and 5 data-line pitches in the horizontal direction. Each cross-point cell contains cross-point circuitry that connects one vertical output line to one particular input line. An example of this connection is point 305. Each output line is connected to one and only one input line. This connection is dependent on selection of the macro cell. If the address impressed on the address bus selects this particular macro cell, then all connections of inputs to outputs in the macro cell will be activated. Stacked vias are located in the common gap 306 between vertical data lines and between horizontal data lines. These stacked vias connect the appropriate input data lines and output data lines to the cross-point circuitry through jumpers that connect the data lines to the stacked vias.

Each quadrant of the crossbar switch conditionally connects each group of 50 data lines in each of 26 input ports to each group of 50 data lines in each of 26 output ports. Each quadrant switches one-fourth of the 200 total data lines that comprise each input and output port. Taken together the four quadrants 201, 202, 203, and 304 in FIG. 3 constitute the complete crossbar switch of 26 input and 26 output ports each comprised of 200 data lines. In this physical configuration the 200 input data lines associated with one input port are grouped into four different physical locations on the left and right sides of the crossbar switch with one group of 50 data lines associated with each of the four quadrants. Similarly the 200 output data lines associated with one output port are grouped into four different physical locations on the top and bottom of the crossbar switch with one group of 50 data lines associated with each of the four quadrants.

Operation of the Preferred Embodiment

Figure 1A:
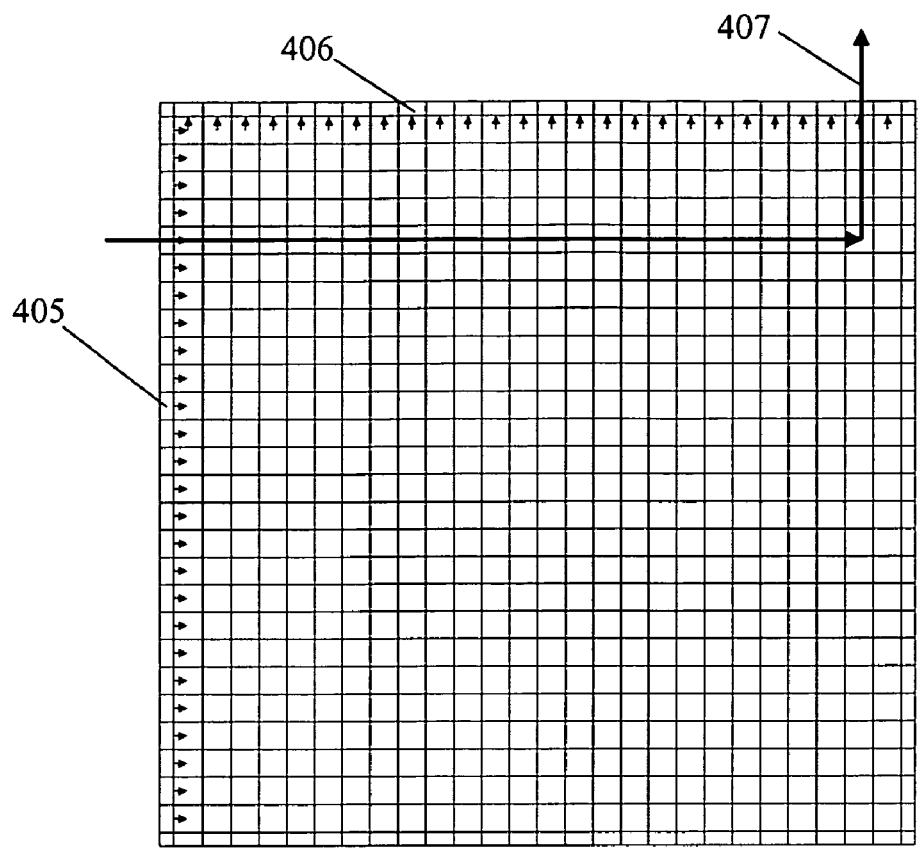
FIG. 1A shows prior art for the physical architecture of a crossbar switch.

FIGS. 1A and 3

Operation of the preferred embodiment of the crossbar switch with grouped inputs and outputs is analogous to the operation for crossbar switches of prior art. In prior art all of the cross points associated with a macro cell at the intersection of the input data lines of one unique input port with the output data lines of one unique output data port are activated. When activated these 200 cross points connect each of the 200 output data lines that comprise the output port to one of the 200 data lines that comprise the input data port. A single macro cell contains all 200 cross points and they are all located together in close proximity. Cross points for a particular macro cell are activated in response to a controller that selects which input port will be connected to each of the output ports. The controller selects the macro cell to be activated for each output port by controlling address lines that are decoded at each macro cell.

Operation of the prior-art crossbar switch is illustrated by FIG. 1A. Input ports are arranged along the left side of the switch and, as an example, one input port 405 drives 200 input data lines horizontally across the crossbar fabric. Output ports are arranged along the top side of the switch and, as an example, one output port 406 is connected to 200 output data lines that run vertically the full length of the crossbar fabric. These 200 data lines can be connected to any set of 200 input data lines by means of a set of 200 cross points associated with each of the 26 input ports. Each set of 200 cross points associated with one particular input port and one particular output port is called a macro cell and is represented by the small squares in FIG. 1A. One possible data path is represented by path 407. In order for this path to be selected 200 cross points would be activated in the macro cell represented by the square at the intersection of the horizontal and vertical paths.

Operation of the preferred embodiment is illustrated by FIG. 3. In this case cross points in four macro cells are activated in order to connect the 200 output data lines that comprise one output port to the 200 input data lines that comprise one of the input data ports. There is one activated macro cell in each of the four quadrants and each macro cell contains 50 cross points. Combined together the four activated macro cells connect all 200 input data lines of one input port to all 200 output data lines of one output data port. As an example, data path 201A connects 50 input data lines from one input port from the Group 1 Inputs to 50 output data lines from one output port from the Group 1 Outputs. Data path 202A connects 50 input data lines from one input port from the Group 2 Inputs to 50 output data lines from one output port from the Group 2 Outputs. Data path 203A connects 50 input data lines from one input port from the Group 3 Inputs to 50 output data lines from one output port from the Group 3 Outputs. Data path 204A connects 50 input data lines from one input port from the Group 4 Inputs to 50 output data lines from one output port from the Group 4 Outputs.

Figure 1B:
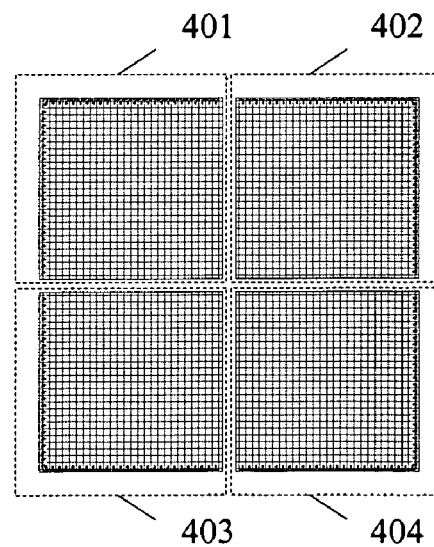
FIG. 1B shows the relative size advantage with four grouped input ports and output ports for a crossbar switch having the same number of input ports and output ports and the same total number of data lines per port but with the data lines grouped into four separate quadrants.

Control of the switch configuration in the preferred embodiment is also analogous to prior-art switch control. A controller selects which sets of four macro cells are activated in order to connect each of the output ports to the desired input ports. This is accomplished by decoding of control addresses in each of the macro cells in each of the four quadrants of the crossbar switch. Each quadrant of the preferred embodiment contains an address bus associated with each of the output ports that is used for selecting which of the macro cells will be activated to connect a particular input port with a particular output port Advantages of the Preferred Embodiment FIGS. 1a and 1b Total area of the crossbar switch is reduced to approximately ¼ the area of a functionally equivalent crossbar switch that groups all of the data lines for each input/output port together. This is due to the simple mathematical fact that $4*(m/4)^2 = m^2/4$ where m is the total number of data lines comprising each input port and each output port. In each quadrant the number of data lines running horizontally and the number of data lines running vertically is reduced to ¼ of the total number of data lines, m, so the area of a quadrant is reduce to ¹⁄₁₆. There are four quadrants required for the complete crossbar switch so the area is reduce to ⁴⁄₁₆=¼. Furthermore the length of individual input and output data lines is reduced to ¼ the length of the data lines of a functionally equivalent crossbar switch that groups all of the data lines for each input/output port together. This reduces the capacitance loading on the data lines to ¼ of that for a functionally equivalent crossbar switch that groups all of the data lines for each input/output port together. This reduces the active power, $CV^2f$, to ¼ of that for a functionally equivalent crossbar switch that groups all of the data lines for each input/output port together. The RC time constant of the data line segments is reduced to ¹⁄₁₆ of that for a functionally equivalent crossbar switch that groups all of the data lines for each input/output port together. This is due to the fact that both R and C are reduced to ¼ of the value for a functionally equivalent switch. This enables a higher frequency of operation and can eliminate the need for buffers on the data lines.

CONCLUSION, RAMIFICATIONS, AND SCOPE

The total number of data paths in each input and output port can be divided into any number of groups, n. For n=2 the data path widths would be split into two equal groups and the complete crossbar switch would be comprised of two halves. This would reduce the area to approximately ½ of that for a functionally equivalent crossbar switch that groups all of the data lines for each input/output port together. Similarly n could be larger than 4. For n=8 the area would be reduced to approximately ⅛ of that for a functionally equivalent crossbar switch that groups all of the data lines for each input/output port together. There is some overhead, however, for addresses and clock lines which reduces this savings. An address bus is needed for each group of outputs in order to control which cross-point circuits are active and clocking is needed in all cross-point cells. This sets practical limits on n. Also, n=4 is very convenient because four quadrants can be fit together with two exposed edges—one for input ports and one for output ports. For n=6 the complete crossbar could be comprised physically of one configuration of 4 quadrants together with a second configuration of 2 halves. For n=8 the complete crossbar switch could be comprised physically of two configurations of 4 quadrants.

Input and output ports can be defined on any edges of the crossbar fabric. Input ports can be split with approximately half on one side and half on the other. Similarly output ports can be split with approximately half on the top and half on the bottom. Splitting is generally not desirable if it results in ports located interior to the fabric since this makes external routing difficult.

Another limitation on useful values of n is the area available for the cross-point circuitry. The area savings cited can be realized only if the circuitry for each cross point in the array can fit into the area available based on the pitch of the data lines. The area available for the cross-point circuitry is approximately proportional to 1/n for a given total data path width. If there is ample area for the cross points and if there are sufficient metal routing resources available in the process technology, it is also possible to superimpose more than one copy of the crossbar switch in the same physical array. This can provide significant area savings. It is also possible to use different definitions of the area assigned to each cross point. For the example of FIG. 4 each cross point was assigned dimensions of 10 input-data-path pitches by 5 output-data-path pitches. This can be altered to any other combinations that allow a total of 50 cross points in the area of the macro cell. It is even possible to blur the definition of the macro cell to include cross points for more than one input and/or output port. Choices are driven by whatever enables the best layout.

Cross-point circuits can consist of any circuitry for connecting input data lines to output data lines. This includes sense amplifier circuits combined with driver circuits or, in the simplest case, transmission gates. The choice depends on the requirements of the switch. Transmission gates are very simple and very small and can be used if the data lines are not too long. Sense amplifiers and driver circuits are needed if the data paths must be long.

The crossbar switch can have any number of input ports and output ports and any number of data lines per port. In general the advantage of grouped inputs and outputs increases as the number of data lines per input or output port increases and as the number of ports increases. In some cases grouped inputs and outputs may enable some desired configurations that would not be possible without this grouping. In other cases grouped inputs and outputs may simplify the switch by eliminating the need for complex buffering schemes. In all cases area and cost are reduced, performance is increased, and power dissipation is reduced whenever grouped inputs and outputs can be used based on the specification of the crossbar switch.

The invention claimed is:

1. A crossbar switch, comprising:
 a. a plurality of cross-point blocks each containing a complete set of orthogonal input ports and output ports sufficient to perform the function of said crossbar switch, and
 b. each of said input ports in each of said cross-point blocks is comprised of a plurality of input data paths of number equal to the total number of input data paths in each port of said crossbar switch divided by the number of said cross-point blocks, and
 c. each of said output ports in each of said cross-point blocks is comprised of a plurality of output data paths of number equal to the total number of output data paths in each port of said crossbar switch divided by the number of said cross-point blocks and routed orthogonally to said plurality of input data paths, and
 d. a plurality of macro cells each comprised of a plurality of cross-point circuits that conditionally connect all of said input data paths that comprise one of said input ports of one of said cross-point blocks uniquely with all of said output data paths that comprise one of said output ports of the same cross-point block, and
 e. said plurality of macro cells is sufficient to connect all of said output ports comprising each of said cross-point blocks to any of said input ports comprising the same cross-point block, and
 f. each of said cross-point blocks contains a fraction of the total number of said input data paths that comprises said crossbar switch and an equal fraction of said output data paths that comprises said crossbar switch and that said fraction is one divided by the number of cross-point blocks, and
 whereby said crossbar switch comprised of said plurality of cross-point blocks requires an area substantially inversely proportional to the number of said cross-point blocks compared to a functionally equivalent crossbar switch comprised of a single block of cross points and the lengths of each of said input data paths and the lengths of each of said output data paths is substantially inversely proportional to the number of said cross-point blocks compared to a functionally equivalent crossbar switch comprised of a single block of cross points resulting in substantial area reduction, power reduction, and performance improvement.

2. The crossbar switch of claim #1, wherein:
 a. said plurality of cross-point blocks consists of four blocks and,
 b. said cross-point blocks are arranged together as quadrants of a composite physical architecture with said input ports and said output ports located on the two exterior sides of each of said quadrants, and
 whereby said crossbar switch comprised of said four cross-point blocks requires an area substantially equal to one-quarter of that required for a functionally equivalent crossbar switch comprised of a single block of cross points and the lengths of each of said input data paths and the lengths of each of said output data paths is substantially equal to one-quarter of the lengths of input and output data paths for a functionally equivalent crossbar switch comprised of a single block of cross points resulting in substantial area reduction, power reduction, and performance improvement and providing easy access to said input ports and to said output ports at the exterior edges of said cross-point blocks arranged as quadrants of said crossbar switch.

3. The crossbar switch of claim #1, wherein:
 a. said plurality of cross-point blocks is each comprised of a plurality of macro cells which are the repeating unit cell of said cross-point block, and
 b. each of said macro cells are comprised of a plurality of cross-point cells, and
 c. each of said cross-point cells contains one or more cross-point circuits for conditionally connecting a single unique input data line to a single unique output data line, and
 d. each of said cross-point cells contained in each of said macro cells physically spans the same number of said input data lines and the same number of said output data lines, and
 e. said macro cells and said cross-point cells are optimized in physical layout such that the area of said cross-point cells is just sufficient for the area required for the cross-point circuits contained in said cross-point cells plus any essential overhead,
 whereby said crossbar switch will be optimized for area, power, and performance based on optimized selection of the number of said cross-point blocks and the physical layout of said macro cells and said cross-point cells.

* * * * *